(12) United States Patent
Martin et al.

(10) Patent No.: US 7,563,368 B2
(45) Date of Patent: Jul. 21, 2009

(54) FILTRATION DEVICE WITH RELEASABLE ADDITIVE

(75) Inventors: Harold R. Martin, Cookeville, TN (US); Abby True-Dahl, Sparta, TN (US); Ted Loftis, Cookeville, TN (US); Ismail Bagci, Cookeville, TN (US); Wassem Abdalla, Quimper (FR); Mark J. Johnson, Cookeville, TN (US); Barry M. Verdegan, Stoughton, WI (US); Peter K. Herman, Stoughton, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 128 days.

(21) Appl. No.: 11/609,679

(22) Filed: Dec. 12, 2006

(65) Prior Publication Data

US 2008/0135467 A1    Jun. 12, 2008

(51) Int. Cl.
*B01D 15/00* (2006.01)
*F01M 11/03* (2006.01)

(52) U.S. Cl. .............. 210/201; 210/167.04; 210/167.3; 210/206; 210/335; 210/342

(58) Field of Classification Search ............. 123/196 A; 210/200, 201, 202, 203, 205, 206, 209, 252, 210/256, 321.64, 321.87, 338, 501, 506, 210/335, 342, 315, 167.04, 167.3
See application file for complete search history.

(56) References Cited

U.S. PATENT DOCUMENTS 5,198,107 A * 3/1993 Ponce ......................... 210/338

2003/0111398 A1* 6/2003 Eilers et al. ................. 210/209
2003/0163948 A1   9/2003 Van Leest et al.
2005/0167350 A1   8/2005 Herman et al.
2005/0167351 A1   8/2005 Herman et al.

FOREIGN PATENT DOCUMENTS

KR   20-1998-0039637 U   9/1998
KR   10-2003-0043375 B1  6/2003

OTHER PUBLICATIONS

U.S. Appl. No. 60/815,118, filed Jun. 20, 2006, McCormick et al.
International Search Report of International Application No. PCT/US07/087245.
Written Opinion of the International Searching Authority of International Application No. PCT/US07/087245.

* cited by examiner

*Primary Examiner*—Matthew O Savage
*Assistant Examiner*—Lucas Stelling
(74) *Attorney, Agent, or Firm*—Hamre, Schumann, Mueller & Larson, P.C.; J. Bruce Schelkopf

(57) ABSTRACT

A filtration device is provided that includes a filter component and an additive component. The filter component includes concentrically arranged filtering elements disposed in a filter-in-filter configuration. The additive component includes at least one additive material that is introduced into a working fluid to be filtered. The filter component and additive component provide an assembly for a filtration system that would filter a variety of working fluids. The filter component and additive component provides an assembly that can filter fluids more efficiently. As a result, fluids may enjoy, for example, extended drainage intervals and thereby reduce component wear.

10 Claims, 12 Drawing Sheets

FILTRATION DEVICE WITH RELEASABLE ADDITIVE

FIELD

A filtration device for internal combustion engines, including gasoline and diesel engines, for example such engines used in automobiles, trucks, hydraulics, turbines, heavy equipment, and the like, which require fluid filtration for a variety of working fluids. The filtration device is a filter component combined with an additive component. The filter component includes a concentric arrangement of filtering elements disposed as a filter-in-filter configuration. The additive component includes at least one additive material for introduction to a fluid to be filtered. A filtration device is provided that may be useful, for example, to improve fuel filtration in high pressure common rail (HPCR) fuel systems.

BACKGROUND

Internal combustion engines are still the predominant means for propelling motorized vehicles. They are proven to offer many advantages over alternative mechanisms, among these being cost and convenience. These engines have been used in gasoline and diesel engines, for example, such engines as used in automobiles, trucks, hydraulics, turbines, heavy equipment, and the like. Such engines can require fluid filtration for a variety of working fluids.

As one example, high pressure common rail (HPCR) fuel systems may require a filtration device for filtering particles as low as 5 micron and lower. Thus, there is a need to provide reliable fine filtration of fuel to reduce engine wear. Further, there is a need to further improve fine filtration and additive release configurations, and particularly in engines employing HPCR fuel systems.

As one other example, such engines can require lubrication filtration, where a circulating lubricant, such as oil, is usually employed as the working fluid. Filters have been commonly used to filter oil to remove contaminants, thereby protecting a combustion engine and preventing damage to the engine and its components lubricated by the oil. One example of a contaminant or by-product of combustion is the generation of acids in the ring zone of the engine. Acids can degrade the quality of the oil and shorten oil drain intervals, and if the oil is not changed, can reduce the intended effectiveness of the oil thereby leading to engine damage or failure. The concept of introducing additives to remove and neutralize engine generated acids is known, and intended to extend oil drain intervals without changing oil additive package chemistry. It is believed that this concept works in the following manner. Where acids generate in the ring zone of the engine, a weak-base forms an acid-base pair with the engine generated acid. In many cases, the weak base may already be present in the oil. The weak base begins neutralization of the engine generated acid, and carries it away from the ring zone to the filter. In the filter, an immobilized strong-base will "grab" the acid away from the weak base to form an acid-base pair that is trapped by the immobilized strong base, thereby neutralizing the acid. The weak base is then free to react with more acids in the ring zone, carrying them back to the immobilized base. However, efficient filtration is critical to extend oil drainage intervals, and there is still a need to further improve upon lubrication filtration and improve upon introducing additives for neutralizing acids.

More generally, there is a need to provide reliable fine filtration for a variety of working fluids so as to reduce engine wear. There also is a need to further improve upon introducing additives for any filtering purpose, so as to provide efficient filtration and extend the useful life of working fluids. In addition to improving, for example, fine filtration in HPCR fuel systems and improving acid neutralization in lube filtration, an improved filtration device as described herein below can provide additional benefits for introducing an additive, and may be used in other fluid filtration applications, for example, to increase lubricity, to protect against corrosion, to aid in combustion, or to otherwise treat or enhance a working fluid.

SUMMARY

A filtration device is provided that includes a filter component combined with an additive component. The filter and additive components provide a device that may be used in a variety of filtration applications for filtering a variety of working fluids. The filter component provides a concentric arrangement of filtering elements disposed in a filter-in-filter type configuration. The additive component provides various configurations for introducing an additive material to a working fluid. The device can filter fluids more efficiently, for example, by providing improved fine filtration of a working fluid and by providing benefits of release of additive chemicals into a working fluid. As a result, the device can allow working fluids to enjoy extended drainage intervals and can help reduce component wear.

Generally, one embodiment of a filtration device comprises a filter component combined with an additive component operatively connected to the filter component. The filter component is arranged as a plurality of concentric filtering elements disposed in a filter-in-filter type configuration. Each filtering element has a filter media allowing a working fluid to flow through the filter media while removing contaminants from the working fluid. The additive component includes at least one additive material that can be introduced to the working fluid to be filtered.

The additive component of the filtration device may be provided in a variety of configurations for introducing at least one additive material to a working fluid. Further, the additive component may employ a variety of slow and immediate additive release mechanisms, or combinations of both, that are known and novel. The additive component may be either incorporated in the filter component or disposed external to the filter component. The following are some exemplary embodiments of additive component configurations that may be combined with a filter component in accordance with the inventive concepts, and namely combined with a filter component having filtering elements in the filter-in-filter configuration.

In one embodiment, an additive component comprises a chemical coating on an inner or outer side of at least one filtering element of the filter component.

In another embodiment, an additive component is configured to be disposed in the filter component and within at least one filter space that is external to the filtering elements.

In another embodiment, an additive component comprises at least one additive material embedded within the filter media of at least one of the filtering elements. The additive material may be disposed throughout a filtering element, where the filtering element is a flow through material that essentially facilitates introduction of an additive material into a fluid. Alternatively, at least one of the filtering elements may each include a plurality of circumferential layers of filter media, where at least one additive material is disposed between the layers of the filter media.

In other embodiments, an additive component may also employ a vessel to introduce at least one additive material to a working fluid. The additive component can employ various suitable vessels, such as for use in pressure gradient liquid release mechanisms and in diffusion release mechanisms. The vessel employed may be disposed at an end of the filter component or disposed in a shortened section of at least one filtering element of the filter component.

In one embodiment, an additive component comprises a vessel for a pressure gradient liquid release mechanism disposed at an end of the filter component. The pressure gradient release mechanism is configured so that a pressure gradient drives the release of at least one releasable additive material from a pressure gradient vessel into a working fluid to be filtered.

In another embodiment, an additive component comprises a vessel for a diffusion mechanism disposed at an end of the filter component. The diffusion mechanism is configured so that at least one releasable additive material diffuses from a diffusion vessel into a working fluid to be filtered.

In another exemplary embodiment, an additive component comprises an end plate disposed at an end of the filter component. The end plate includes an insoluble material and at least one releasable additive material disposed therein. As some exemplary configurations, the end plate includes at least one releasable additive material that may be injection molded in the end plate, that may be poured in the end plate, or that may be otherwise put there. The end plate is configured to allow the releasable additive material to dissolve from the end plate and diffuse into a working fluid to be filtered.

In yet another embodiment, an additive component comprises at least one additive material comprising multiple sections or vessels disposed between multiple filtering element sections, where the additive material can be introduced to a working fluid.

Any of the above embodiments described may provide an improved filtration device that can filter fluids more efficiently, for example, by providing improved fine filtration of a working fluid and by providing such benefits as releasing additive chemicals into a working fluid. As a result, the device can allow working fluids to enjoy extended drainage intervals and can help reduce component wear.

DETAILED DESCRIPTION

The following description herein details multiple embodiments for an inventive filtration device. Generally, the filtration device is a filter component combined with an additive component. The filter component is a concentric arrangement of filtering elements disposed in a filter-in-filter type configuration. The additive component is operatively connected with the filter component and is provided with various configurations for introducing at least one additive material into a working fluid. The filter and additive components provide a device that may be used in a variety of filtration applications for filtering a variety of working fluids. The device can filter fluids more efficiently, for example, by providing improved fine filtration of a working fluid and by providing benefits as additive release of chemical(s) into a working fluid. As a result, the device can allow working fluids to enjoy extended drainage intervals and can help reduce component wear.

Figure 1A:
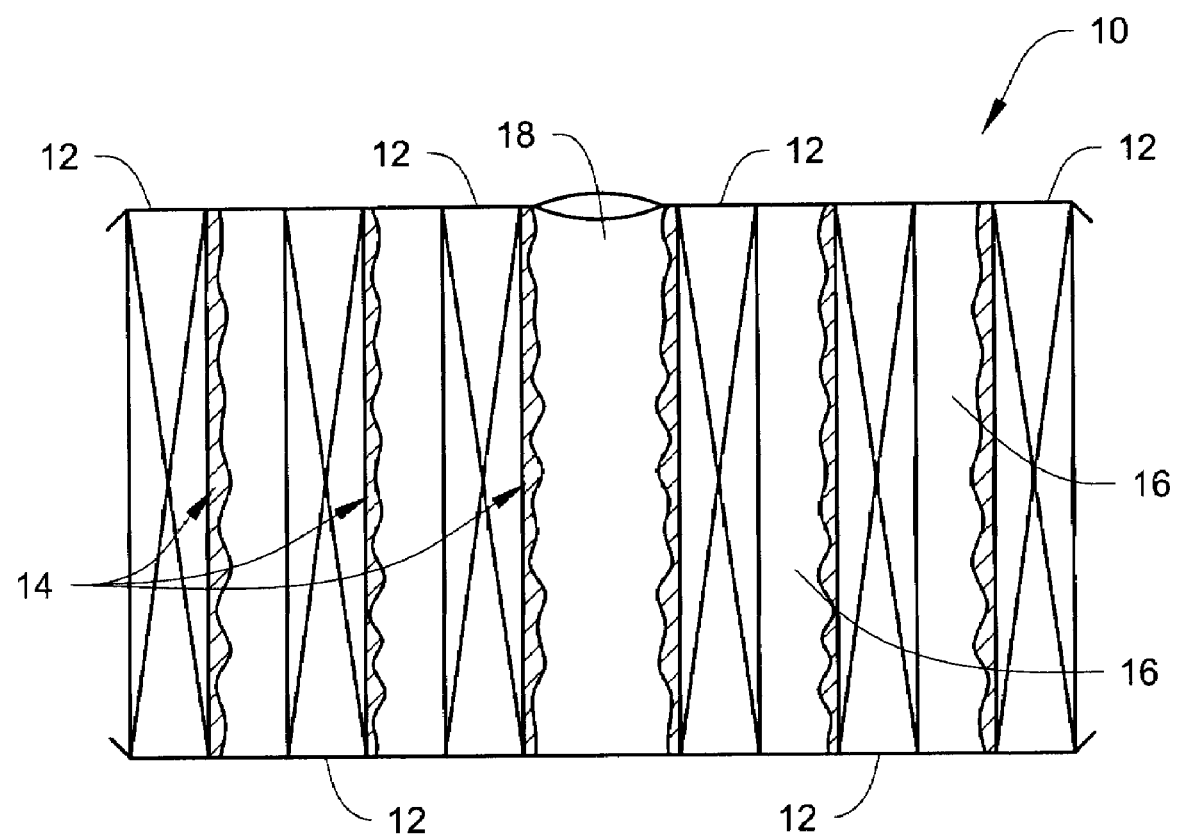
FIG. 1A illustrates a side schematic view of one embodiment of a filtration device incorporating the inventive concepts and showing one embodiment of an additive component having at least one additive material disposed as a coating on a surface of a filtering element.
Figure 1B:
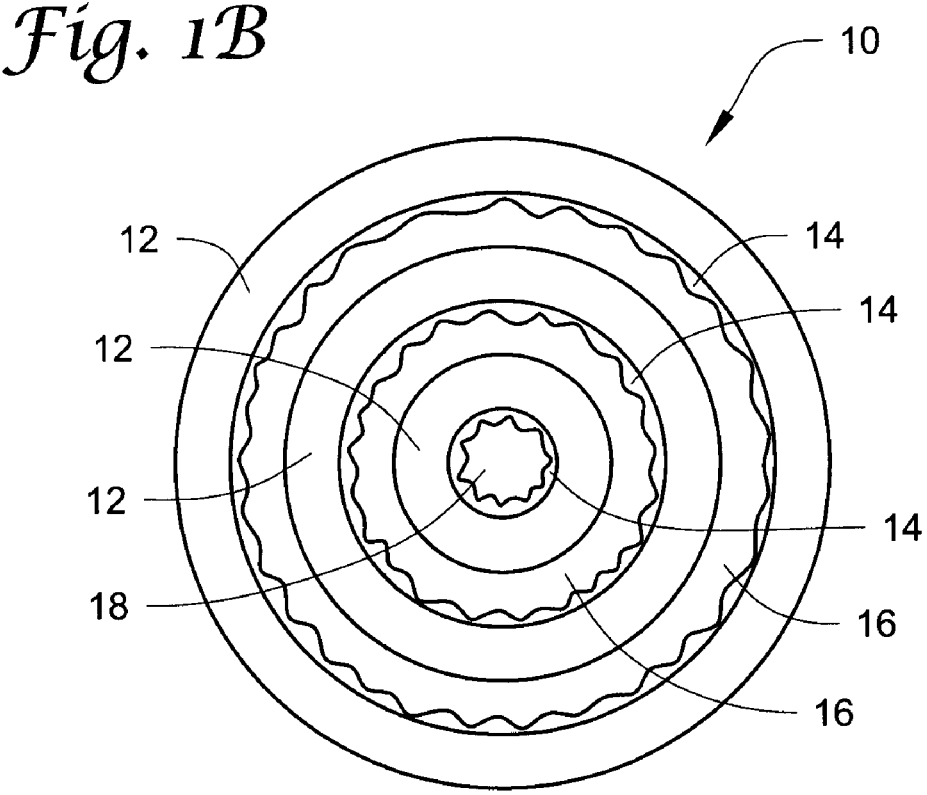
FIG. 1B illustrates a top schematic view of the filtration device of FIG. 1A.

FIG. 1A and FIG. 1B are schematic illustrations of one embodiment of a filtration device 10. The filtration device 10 includes a filter component and an additive component 14. The filter component includes a plurality of filtering elements 12 that are concentrically arranged in a filter-in-filter type configuration.

In a preferred embodiment, the filtering elements 12 define filter spaces 16 external to the filtering elements 12, for example the spaces between filtering elements 12. It will be appreciated that the filter spaces include such spaces as between filtering elements (i.e. spaces 16), and also can include spaces such as before a first or outermost filtering element and after an innermost filtering element. The filter space disposed after the innermost filtering element is shown as a center space 18 (towards center of device 10). It will be appreciated that there may be a desire such that the concentric filtering element arrangement do not require filter spaces between all or any of the filtering elements, so long as a desired fluid may still filter through the filter component.

The filter-in-filter configuration of the filtering elements 12 is composed of at least two concentrically arranged filtering elements 12. As shown in FIGS. 1A and 1B, the device 10 includes three filtering elements 12. It will be appreciated that more than three filtering elements may be employed for a desired filtering performance, so long as at least two filtering elements are concentrically arranged.

The filtering elements 12 may be composed of the same media, or each filtering element 12 may have its own unique media or media combination therein. Filter media, such as used in engine filtration applications, are well known. Such filter media are used in applications including but not limited to, for example, automotive engine filtration, fuel filtration, lubricating oil filtration, hydraulic filtration, coolant filtration, and other filtration systems. As one example only, the filter media may be any known fibrous filtering media known in the art, and can include, but is not limited to cellulose, polymeric, glass, ceramic, metal fiber, and other types of filter media. It will be appreciated that filter media is not limited to a specific material, so long as the filter media facilitates filtering out undesired material and allows a desired working fluid to pass therethrough.

The filtering elements 12 may be, for example, assembled together as stand alone (cartridges), such as separate cartridges, where each filtering element 12 may be separately removed from the remaining filtering elements 12. As another example, the filtering elements 12 may be combined into a single stand alone cartridge, where a plurality of filtering elements 12 are held together, so that they may be simultaneously removed for servicing or replacement. As another example, the filtering elements 12 may be housed within an exterior housing, such as in a disposable spin-on type filter or in a permanent and reusable filter housing.

Concerning fluid flow through the filter component, a desired fluid for filtering may either be filtered inward from the outer filtering elements toward the innermost filtering element and to the center, or be filtered outward from the center and the innermost filtering element toward the outer filtering elements. It will be appreciated that the direction of fluid flow is not limited, so long as fluid passing through the filtration device can be filtered through a first or upstream-most filtering element before being filtered through a second or downstream filtering element, and so on through a last or downstream-most filtering element, if there are more than two filtering elements. That is, either the innermost filtering element or the outermost filtering element may be the last or downstream-most filtering element, depending on the direction of fluid flow. Likewise, the additive component (discussed in detail below) can be arranged accordingly to accommodate the desired direction of fluid flow. For ease of description, however, the following embodiments will be described from the perspective of an inward fluid flow direction, where the innermost filtering element is the downstream-most filtering element.

As will be described below in FIGS. 1A-9, the filter component, or concentrically arranged filtering elements, is operatively connected to the additive component for introducing an additive material to a working fluid. Additionally, the filter component may be operatively connected with various slow or immediate release mechanisms or combinations thereof for introducing an additive material into a working fluid.

Generally as shown in the Figures, the additive component is operatively connected with the filter component, such as by being incorporated in the filter component or disposed external to the filter component. For example, the additive component may be structurally attached to or structurally coupled with the filter component. Additionally, the additive component may be coated on or disposed between filtering elements of the filter component, or otherwise may be put in the filter component. It also will be appreciated that, as another example, the additive component may be spaced apart from the filter component and may not be structurally connected with the filter component. The result of being operatively connected can be achieved by various means, and the meaning is not limited, so long as the additive component may effectively introduce at least one additive material to a working fluid being filtered by the concentrically arranged filtering elements of the filter component. Thus, it will be appreciated that "operatively connected" is not limited to a specific structure.

By the term "working fluid," it generally is meant to be a working material requiring filtration. Such fluids may be any working material typically used in applications such as, but not limited to, for example, automotive internal combustion engines, hydraulic applications, power generation, industrial process fluids, or coolants. These working materials include such fluids as, but not limited to, fuel, lubricating oils, hydraulic fluids, coolants, water, power transmission fluids, and other various fluids.

By the term at least one "additive material," it generally is meant to be a chemical material that may be introduced to a working fluid for treating or enhancing the working fluid. In one preferred example, the additive material is releasable, and may be any chemical suitable for treating and/or enhancing a particular working fluid. It will be appreciated that an additive material may not be released into a working fluid. Rather, the additive material may be immobilized to contact and treat a working fluid that flows through an immobilized additive material (i.e. in acid neutralization for lubrication filtration). It will further be appreciated that more than one type of additive material may be employed and may include releasable additive materials, non-releasable additive materials, or a combination of both releasable and non-releasable type additive materials.

The additive material employed may be any in any suitable form such as, but not limited to, a liquid, a gel, granules, powders, a wax, a soluble mold, or other soluble materials, and the like. The chemical form of the additive is not limited, so long as it can be introduced with a fluid being filtered. It will be appreciated that the physical state or properties associated with the additive material may affect the mechanism for how the additive material can be introduced to a working fluid, or may affect the rate at which the additive material is released.

As one example only and that particularly benefits from the present disclosure, fuel filtration applications may employ a variety of additive materials. Such additive materials include, but are not limited to, lubricity enhancing agents, dispersants, detergents, c-tane improvers, flow improvers, fuel burning catalysts, corrosion inhibitors, deicers, power point suppressants, antioxidants, conductivity improvers, microbicides, and suitable combinations thereof.

It will be appreciated that other additive material varieties may be employed in other filtration applications. Such additives include those additives as typically known and used in other working fluids, for example, lubrication, hydraulic, and coolant fluid types. Thus, a variety of additive materials may be employed depending on the desired filtration application. The additive material is not limited to any particular application or purpose, so long as the additive material(s) is suitable for working fluid applications, such as for removing or neutralizing undesired contaminants, or for enhancing performance of a working fluid, or otherwise treating a fluid(s) being filtered.

Turning back to the additive component 14 of FIGS. 1A-1B, the additive component 14 is combined with the filter component described above for introducing at least one additive material to a working fluid. The additive component 14 is a chemical coating applied on at least one of the filtering elements 12. The chemical coating provides at least one additive material that may be releasable from the coating. As shown, the chemical coating is disposed on a center tube defined by each filtering element 12 and resides on an inner side of the filtering elements 12. It will be appreciated that a center tube does not interfere with the filtering function of its respective filtering element, and is meant to provide a substrate or surface for the coating to be applied and to provide a structural support to the filter media composing the filtering element.

As shown, the coating is applied on the center tube of the inner side of the filtering elements 12. Such a configuration is desirable, for example, for use of inward directional flow from the outer filtering elements toward the inner filtering elements. It will be appreciated, however, that the coatings may be disposed on outer sides of the filtering elements, such as when fluid flows outward from the inner filtering elements toward the outer filtering elements.

FIGS. 1A-1B show the chemical coating disposed on each filtering element 12. However, it will be appreciated that this specific configuration is merely exemplary, as the chemical coating may be disposed on less than all of the filtering elements 12 of a filtration device if desired.

Figure 1C:
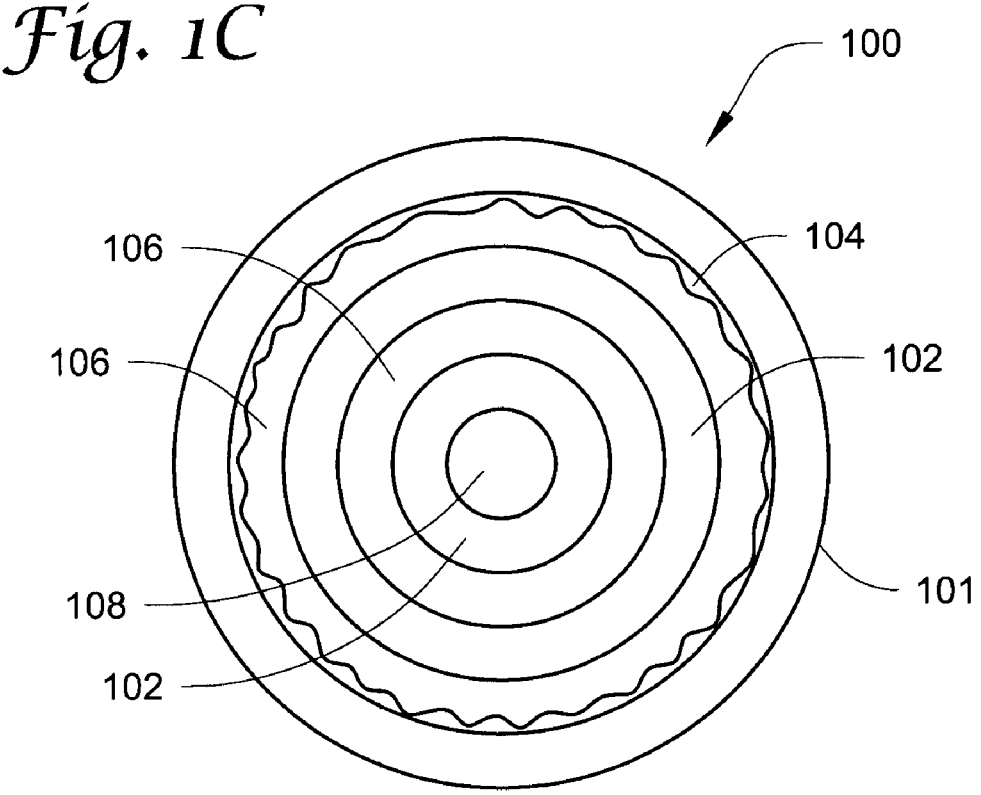
FIG. 1C illustrates a top schematic view of another embodiment of a filtration device incorporating the inventive concepts and showing another embodiment of an additive component having at least one additive material disposed as a coating on an inner surface of an external housing prior to the filtering elements.

In FIG. 1C, a device 100 illustrates the same coating concept of FIGS. 1A and 1B, except that the additive component 104 is a coating disposed on an inner surface wall of an external housing 101. Such a configuration may be suitable such as in spin-on or permanent housing embodiments of a filter component. An additive material in the additive component 104 may be introduced to a fluid at a space before a first filtering element 102. As shown, the filtering elements 102 do not have the coating applied. However, it will be appreciated that, as with FIGS. 1A and 1B, the coating may be applied to inner or outer surfaces of the filtering elements 102, including between the filter spaces 106 and the center space 108.

The coating may be configured as suitable for use in slow or immediate release applications or a combination of both. It will be appreciated that the coating may not be released into a working fluid. Rather, the coating may be immobilized to contact and treat a working fluid that flows through an immobilized additive material contained in the coating. In slow release applications, for example, a coating may be configured as an additive material on a filtering element, such as but not limited to a thickly applied gel or thick gel, or a solid material having a lower solubility property, where the additive material(s) may dissolve and release more slowly from the filtering elements 12. In more immediate release applications, for example, a coating may be configured as an additive material on a filtering element, such as but not limited to a thinly applied gel or thin gel, or a solid material having a higher solubility, such that the additive material(s) may dissolve and release more quickly from the filtering elements 12. It will be further appreciated that more than one type of additive material may be employed as the coating, such that a coating may employ slow release type additives, or immediate release type additives, or a combination of both slow and immediate release type additives.

Figure 2A:
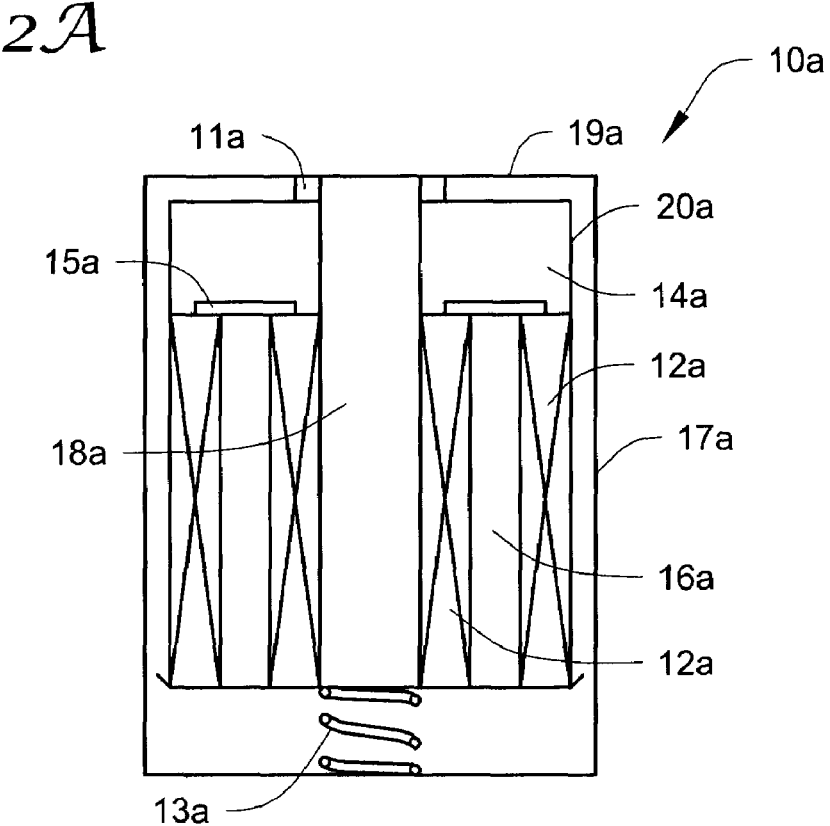
FIG. 2A illustrates a side schematic view of another embodiment of a filtration device incorporating the inventive concepts and showing one embodiment of an additive component that includes a vessel for releasing at least one additive material.
Figure 2B:
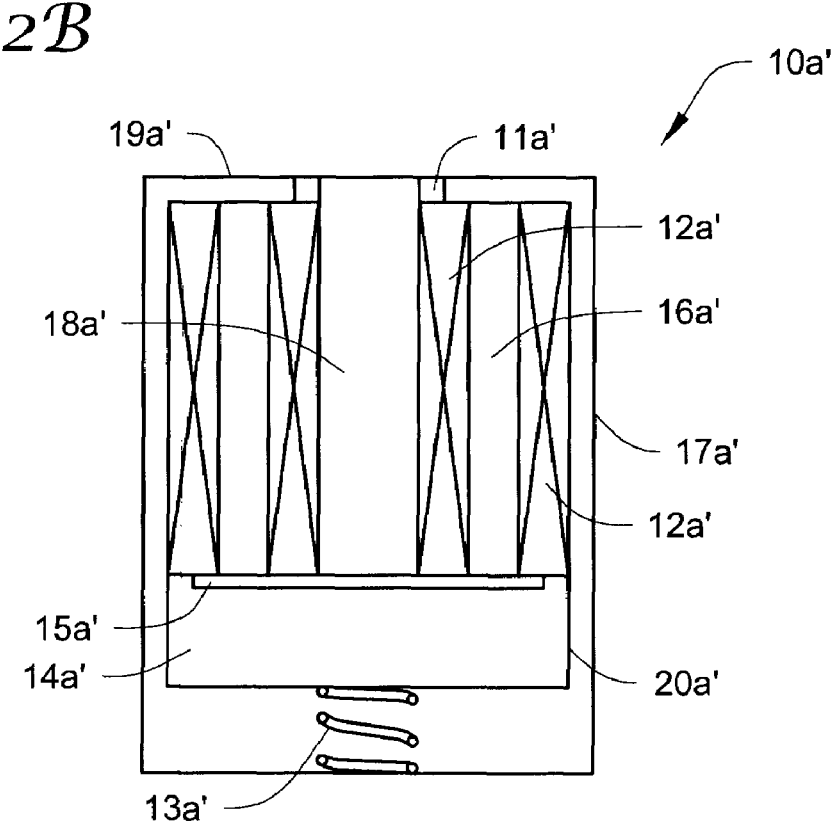
FIG. 2B illustrates a side schematic view of another embodiment of a filtration device incorporating the inventive concepts and showing one embodiment of an additive component that includes another embodiment of a vessel for releasing at least one additive material.

Turning to FIGS. 2A and 2B, other embodiments of a filtration device 10a, 10a' are shown with other configurations of an additive component 14a, 14a'. The additive components 14a, 14a' are located at one end of the plurality of filtering elements 12a, 12a'. As the filtering elements 12a, 12a' are concentrically arranged, filter spaces 16a, 16a' and center space 18a, 18a' are similarly constructed as in FIGS. 1A-1C.

In FIG. 2A, the additive component 14a is configured as a release vessel 20a disposed at an end of the filtering elements 12a. A biasing member 13a or spring biases the filter component (concentric filtering elements 12a) and additive component 14a (including the vessel 20a) toward the end and against gasket 11a and nut plate 19a. As shown, a housing 17a contains the filter component and the additive component. The vessel 20a is disposed toward a fluid exiting end of the filtration device 10a, where a working fluid filters through the center space 18a and exits the device 10a through the outlet at the end. When the vessel 20a is in this end position, it is configured as a hollow cylindrical or "doughnut" shape that may be disposed about the center space and outlet. The vessel 20a includes an opening 15a that is configured to release at least one additive material therethrough. As shown, the opening 15a enables release of an additive material into the filter space 16a and the filtering elements 12a. It will be appreciated that the opening 15a may be constructed of various sizes so as to suitably allow or not allow release of an additive material into any of the filter spaces 16a, center space 18a, and/or filtering elements 12a. Further, by altering the size of the opening, the release rate of an additive material can be modified.

In FIG. 2B, the additive component 14a' is configured as a release vessel 20a' disposed at one end of the filtering elements 12a'. A biasing member 13a' or spring biases the filter component (concentric filtering elements 12a') and additive component 14a' (including the vessel 20a') toward another end and against gasket 11a' and nut plate 19a'. As shown, a housing 17a' contains the filter component and additive component. The vessel 20a' is disposed at a closed end of the filtration device 10a'. When at this end position, the vessel 20a' is configured as a cylindrical shape. The vessel 20a' includes an opening 15a' configured to release at least one additive material therethrough. As shown, the opening 15a' enables release of an additive material into the filter space 16a', the center space 18a', and the filtering elements 12a'. As in FIG. 2A, it will be appreciated that the opening 15a' may be constructed of various sizes so as to suitably allow or not allow release of an additive material into any one or more of the filter spaces 16a', center space 18a', and/or filtering elements 12a'. Further, by altering the size of the opening, the release rate of an additive material can be modified. It will be further appreciated that the openings 15a, 15a' may include one or more orifices for releasing an additive material into a working fluid, and such as for releasing an additive material into various positions of the filter component.

Figure 5A:
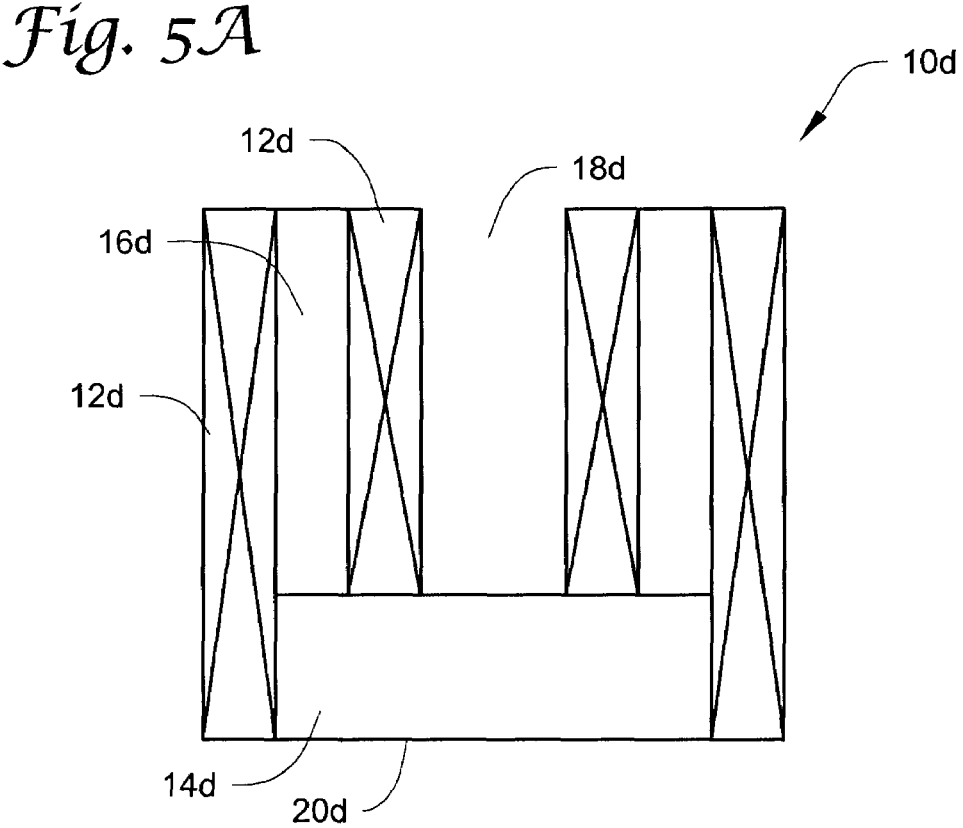
FIG. 5A illustrates a side schematic view of another embodiment of a filtration device incorporating the inventive concepts and showing another embodiment of an additive component that includes a vessel disposed in a shortened section of at least one filtering element of the filter component.
Figure 5B:
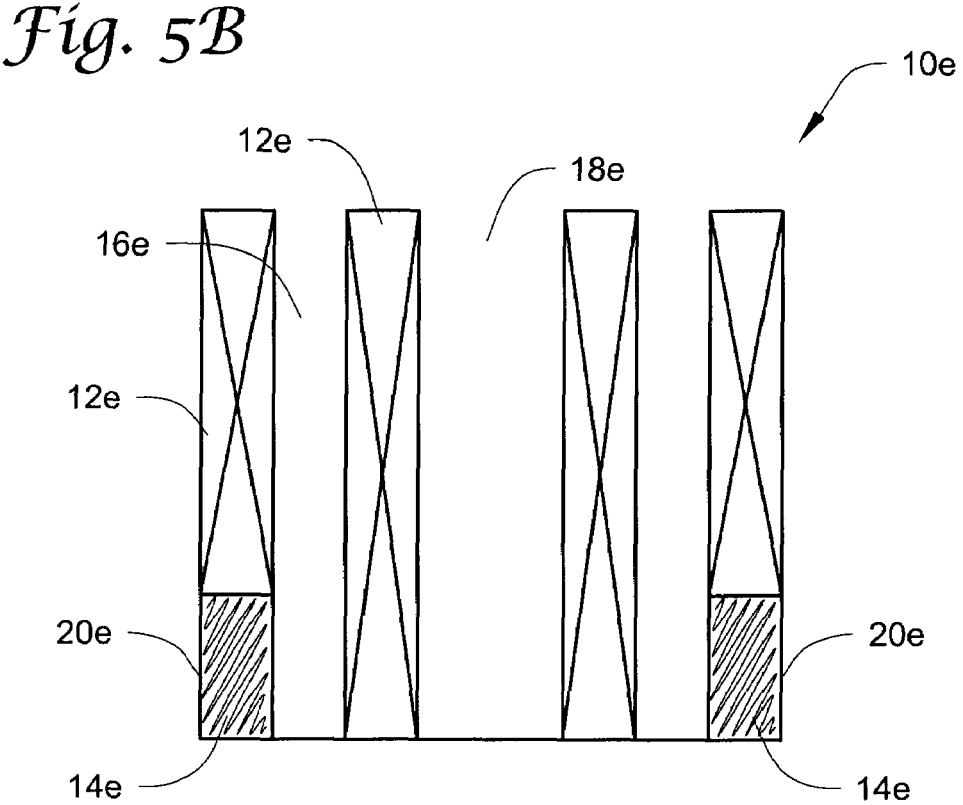
FIG. 5B illustrates a side schematic view of another embodiment of a filtration device incorporating the inventive concepts and showing another embodiment of an additive component that includes a vessel disposed in another shortened section of at least one filtering element of the filter component.

As shown in FIGS. 2A and 2B, the filtering elements 12a, 12a' are of similar length. It will be appreciated that the filtering elements 12a may be of differing lengths to accommodate placing a vessel for an additive component proximate an end of the filtering elements. Some examples of this configuration are illustrated in FIGS. 5A and 5B, which will be described hereinbelow.

The vessels 20a, 20a' may be configured for use in a variety additive release mechanisms. As one example only, the vessels 20a, 20a' may be configured for use as a diffusion vessel. The diffusion vessel contains, for example, a liquid additive material that may diffuse from the vessel into a working fluid flowing through the filter component. It will be appreciated that the additive material may diffuse into the filter component, such as for example, into any one or more of the filter spaces (16a, 16a'), center space (18a, 18a'), and filtering elements (12a, 12a').

As a diffusion vessel, the vessels 20a, 20a' may be configured as suitable for use in slow or immediate release applications or a combination of both. The diffusion vessels are not limited as to its rate of release, and can depend upon, for example, the size and number of openings from the vessel, and the physical properties of the additive material itself. As one example only, the additive material is a liquid contained in the diffusion vessel that may be configured for immediate release into a working fluid. It will be appreciated that more than one type of additive material may be contained in a diffusion vessel, such that the vessel may employ slow release type additives, or immediate release type additives, or a combination of both slow and immediate release type additives. As known in the art, it will also be appreciated that the vessel may include a fluid soluble seal (not shown) at its opening(s), so that when the seal is dissolved over time, the additive material may be released into the working fluid to be filtered.

As another example, the vessels 20a, 20a' may be configured as a fluid insoluble material or polymer matrix that contains at least one releasable additive material therein. The additive material is configured to be released into a working fluid, while the fluid insoluble material remains. As some exemplary configurations, the least one releasable additive material may be injection molded in the end plate, may be poured in the end plate, or may be otherwise put there. As one example only, the vessels 20a, 20a' may be configured as an end plate having the releasable additive material injection molded into the end plate. The end plate may be any injection molded plastic component or polymer material. The end plate is disposed at the end of the concentrically arranged filtering elements, where the additive material can diffuse from the final polymeric part into a working fluid.

Figure 3:
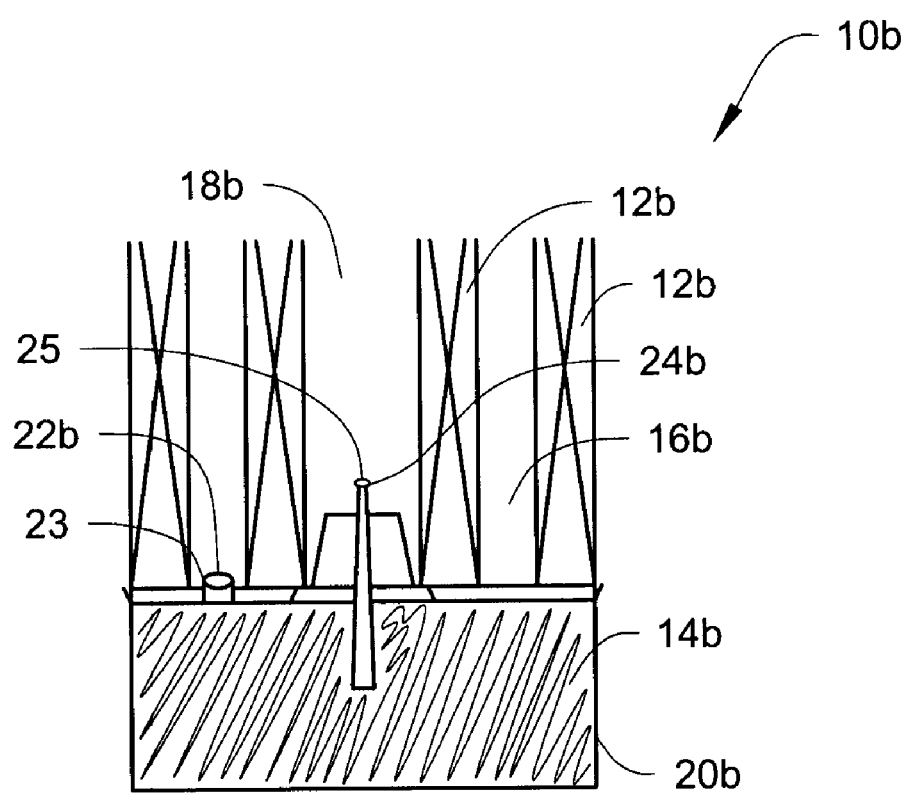
FIG. 3 illustrates a partial side schematic view of another embodiment of a filtration device incorporating the inventive concepts and showing one embodiment of an additive component that includes a vessel for a pressure gradient liquid release mechanism for releasing at least one additive material.
Figure 4:
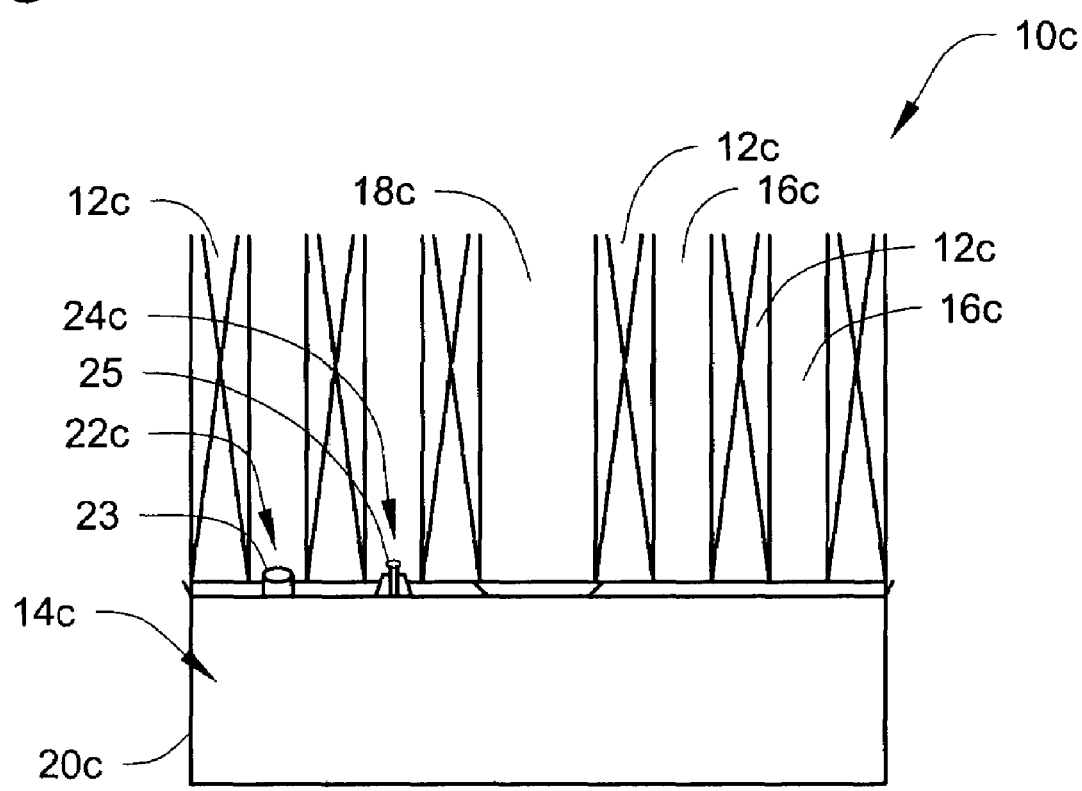
FIG. 4 illustrates a side schematic view of another embodiment of a filtration device incorporating the inventive concepts and showing another embodiment of an additive component that includes a vessel for a pressure gradient liquid release mechanism for releasing at least one additive material.

FIGS. 3 and 4 describe separate embodiments for filter assemblies 10b, 10c. The filtering elements 12b, 12c are operatively connected with additive components 14b, 14c, which include vessels 20b, 20c. In these embodiments, the vessels 20b, 20c are constructed for use as a vessel for pressure gradient liquid release mechanisms.

Pressure gradient liquid release mechanisms are known. Typically, such mechanisms are slow release mechanisms that are configured so that a pressure gradient develops within the filtration device to drive the release of an additive material into the filter component spaces. These mechanisms function as follows.

A pressure gradient would be developed between an inflow path of the fluid through the filter media of the filter component. When fluid is meant to flow inward, for example, the pressure gradient is such that a higher pressure exists in the inflow path at upstream filtering elements rather than downstream filtering elements. This pressure gradient is used to drive a releasable additive material, and preferably into the filter component at a controlled rate.

Figure 10:
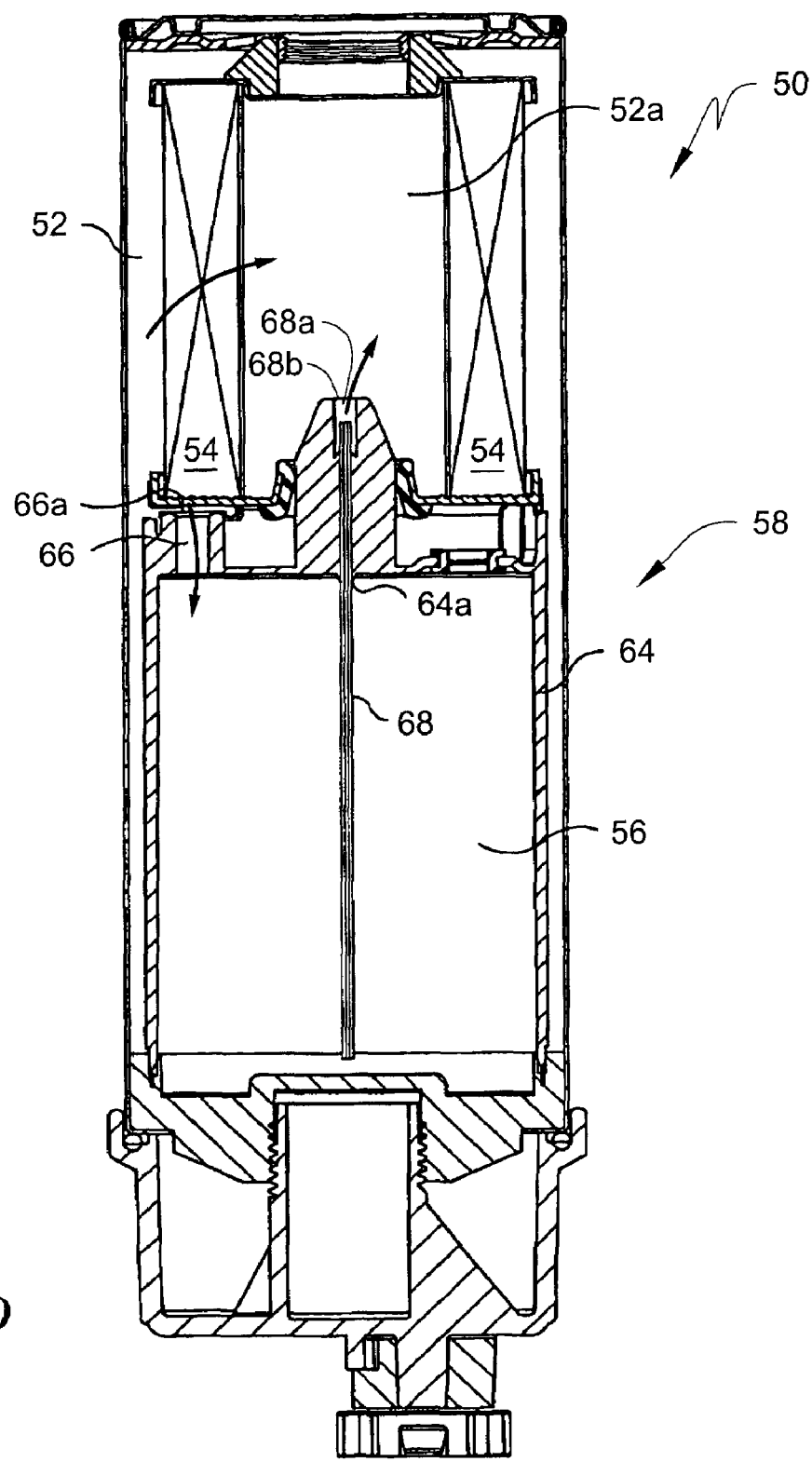
FIG. 10 illustrates a side sectional view of one embodiment of a known filter device and which may be capable of incorporating the inventive aspects of the filtration devices shown in FIGS. 1A-9.

One example of a known pressure gradient mechanism 58 in a filtration device 50 is shown in FIG. 10, which is further described herein. The pressure gradient mechanism 58 is similarly constructed as (and can be found) in U.S. published patent application nos. 2005/0167351 and 2005/0167350, both published on Aug. 4, 2005.

In particular, the pressure gradient mechanism 58 includes a vessel 64 with an initiating orifice 66 and a release tube 68. The release tube 68 may be a capillary tube that extends upwardly from the base of the vessel 64 through an outlet 64a into a space 52a within the filter component 52. The release tube 68 would extend upwardly beyond the initiating orifice 66. The upper end of the release tube 68 includes an outlet 68a, and is located within the lower pressure section (or space 52a) of the filter component 52, so as to enable the discharge of a releasable additive material 56 into fluid flowing through the filtration device 50. The initiating orifice 66 is positioned so that it is exposed to a higher pressure than the outlet 68a of the release tube 68. The bottom end of the release tube 68 would include one or more openings through which additive material 56 flows into the release tube 68, driven by the pressure differential between the initiating orifice 66 and the outlet 68a. Based on the pressures generated in the filtration device, the opening size of the initiating orifice 66 and the release tube 68, and the length of the release tube may be suitably designed, a desired rate of introduction of the releasable additive material into a fluid being filtered by the filtration device can be achieved.

Preferably, the vessel 64 is sealed during manufacture and shipping, so as to delay the release of the additive material 56 from the vessel 64 until it is used and a critical threshold of the fluid has been reached. For example, a soluble seal 66a, 68b can be placed on the initiating orifice and/or on the outlet of the release tube. The soluble seal(s) would be made of a material that would dissolve under certain fluid conditions (such as for example by fluid type, fluid property, high fluid acidity, etc.) Therefore, the beneficial additive chemistry is saved until it is needed. Preferably, the soluble seal(s) would be composed of a material soluble in organic solvents. As one example only, the soluble seal may be a soluble polymer such as a wax material or the like. As another example, a soluble seal material that dissolves upon exposure to the normal operating temperatures of a fluid flowing through the filtration device could be used.

When the seal(s) dissolve, a pressure that is higher than the pressure acting on the release tube outlet 68a would act on the initiating orifice 66, which forces the additive material 56 through openings in the release tube 68 and upward through the outlet 68a.

Further details on pressure gradient slow release mechanisms in filter assemblies can be found in the U.S. published patent application nos. 2005/0167351 and 2005/0167350, which are incorporated herein by reference in their entirety.

Turning to FIG. 3, one improved embodiment of a pressure gradient release vessel 20b is shown. An additive component 14b would include at least one additive material that is configured for release by a release tube 24b after the downstream-most filtering element 12b, where the downstream-most filtering element depends on the direction of flow through the filter-in-filter configuration. As shown in an inward flow direction, the release tube 24b is disposed in the center space 18b after the innermost filtering element. When an additive material is to be released, the additive material is released on the clean side of the filtering elements 12b. An initiating orifice 22b is located within a filter space 16b and between the innermost filtering element 12b and the filtering element 12b immediately preceding it. It will be appreciated that the initiating orifice 22b may be disposed in any space prior to the space that the release tube 24b is disposed.

In some embodiments, the additive component 14b may be operative to release at least one releasable additive material when a seal 23 is dissolved or broken as explained above. This configuration can give the benefit of having the release of the additive controlled by the pressure differential between the downstream-most or innermost filtering element 12b and the preceding filter space 16b. It will be appreciated that the release tube 24b may also include a seal 25, similarly as seal 23, to further control additive release.

This configuration may also assure consistent release throughout the life of the filtration device due to the fact that the pressure differential can remain relatively constant. This is due to "pre-filtering" of the fluid by the other preceding filtering elements 12b before reaching the downstream-most filtering element, thereby preventing any significant contaminant load from reaching the downstream-most filtering element and causing an increase in restriction of that filtering element.

FIG. 4 illustrates another improved embodiment for a pressure gradient release vessel 20c. An additive component 14c would include at least one additive material that is configured for release by a release tube 24c prior to reaching the downstream-most filtering element 12c. As with FIG. 3 and as one example only, fluid would be meant to flow inward towards the center space 18c. An initiating orifice 22c is located within a filter space 16c between filtering elements 12c and in a space prior to the space where the release tube 24c is disposed. Differently from FIG. 3, the release tube 24c is disposed in another filter space 16c prior to the downstream-most filtering element 12c and the center space 18c.

As with the additive component 14b, the additive component 14c may be configured to release at least one additive material when a seal 23 is dissolved or broken. It will be appreciated that the release tube 24c may also include a seal 25, such as seal 23, to further control additive release.

In this configuration, the additive material is released before the downstream-most filtering element (such as in any filter space 16c after the initiating orifice and between separate filtering elements 12c). In the embodiment shown in FIG. 4, additive release can be consistent due to pre-filtering of the fluid by the preceding filtering element, such that the additive material also flows through a filtering element before entering the clean side of the filter component. This configuration can provide an additional filtration benefit that filters potential contaminants from the additive material in addition to the fluid being filtered. This configuration can provide additional advantages, such that as an outer filter element pressure drop increases, more additive may be released into the fluid. In some filtration applications, this increase may correspond to degradation in function of the fluid, which can be slowed down by the increased chemical addition, thus increasing the life of the fluid.

It will be appreciated that any of the vessels 20a, 20b, 20c, (i.e. diffusion, polymer matrix, or pressure gradient vessels) may be refilled with releasable additive material for continued use, so long as the filtration device is operable for filtration. It will further be appreciated that the release mechanisms or vessels described may be attached externally at either end of the concentrically arranged filtering elements, such as to a pre-existing spin-on type, single cartridge combining filtering elements, or filtering elements as single cartridges. Such attachments may include, but are not limited to, threaded or press fit attachment structures, or other suitable attachment means.

FIGS. 5A and 5B show additional embodiments of filtration devices 10d, 10e having separate configurations for concentrically arranged filtering elements 12d, 12e that are respectively combined with additive component 14d, 14e. In FIG. 5A, an additive component 14d includes a vessel 20d, which contains the additive component 14d, disposed at an end of at least one of the filtering elements 12d. As shown, the filtering element 12d, where the vessel 20d is disposed, is shortened relative to the other filtering element 12d. As some examples only, the shortened filtering element 12d may be formed by molding, cutting-out, or otherwise shaping the filtering element to receive the vessel 20d. The vessel 20d and additive component 14d may be configured to release at least one additive material in any one of the filter spaces 16d, center space 18d, or in the filtering elements 12d. It will be appreciated that the vessel 20d may be configured with at least one opening, such as described in FIGS. 2A and 2B, for allowing introduction or release of an additive material into a fluid being filtered.

FIG. 5B shows an additive component 14e that includes a vessel 20e containing the additive component 14e. As with the embodiment of FIG. 5A, the vessel 20e is disposed at an end of at least one of the filtering elements 12e that is shortened. The vessel 20e and additive component 14e may be configured to release at least one releasable additive material in any filter space 16e, such as spaces between filtering elements. Differently from FIG. 5A, the vessel 20e and additive component 14e are disposed on an end of an outer filtering element, such that an additive material would be introduced prior to the center space 18e. As with the embodiment of FIG. 5, the shortened filtering element 12e may be formed by molding, cutting-out, or otherwise shaping the filtering element to receive the vessel 20e. Further, it will be appreciated that the vessel 20e may be configured with at least one opening, such as described in FIGS. 2A and 2B, for allowing introduction or release of an additive material into a fluid being filtered.

In FIGS. 5A and 5B, the additive component 14d, 14e may reside anywhere upstream or downstream and in any filtering element that is shortened. It will be appreciated that any of the previously described vessels may be modified to satisfy the configurations of FIGS. 5A and 5B. By employing such a configuration, a filtration device may be provided that is more space efficient. It further will be appreciated that an additive component may be configured as a chemical material that is poured into the filter component, such as for example, between or within the filtering elements, where no filtering element need be shortened. In such a configuration, space may also be saved as no vessel is necessary for addition or attachment to the filter component.

Figure 6:
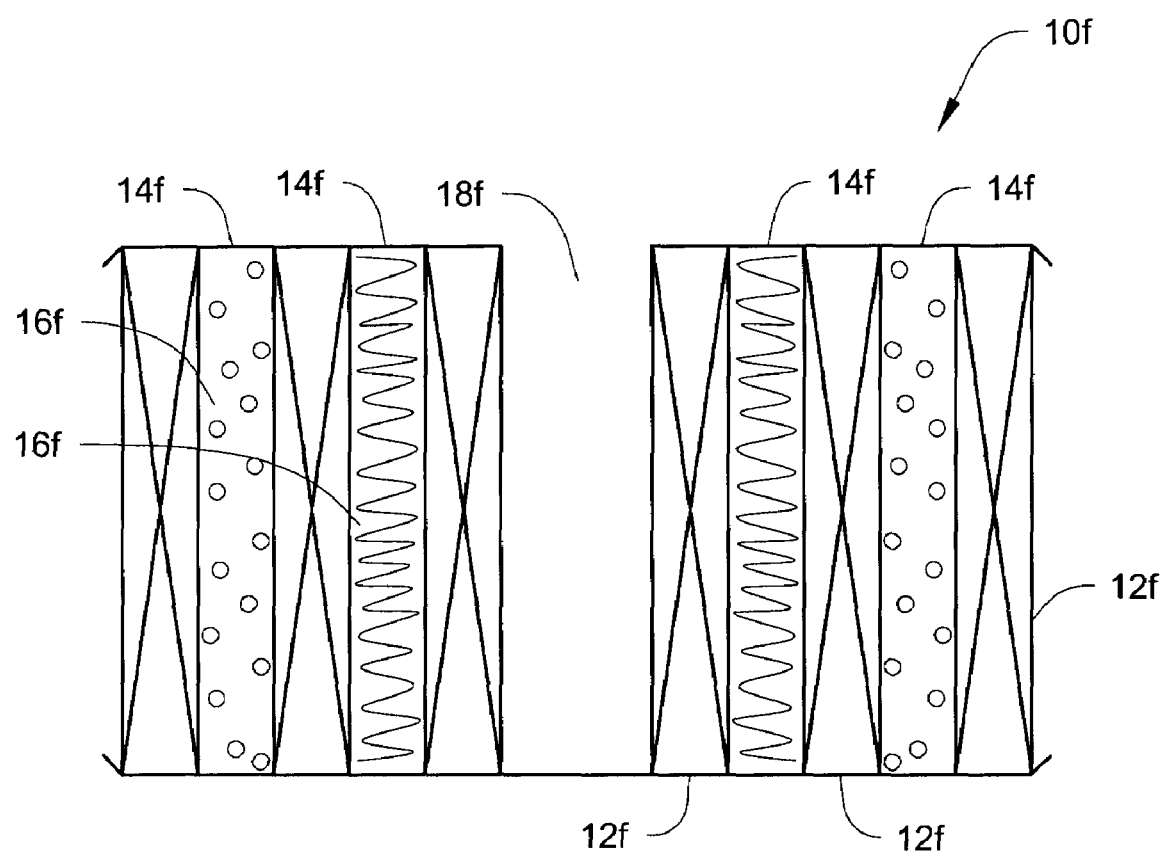
FIG. 6 illustrates a side schematic view of another embodiment of a filtration device incorporating the inventive concepts and showing another embodiment of an additive component disposed in at least one filter space external to filtering elements.

FIG. 6 illustrates another embodiment for a filtration device 10f showing another configuration concentrically arranged filtering elements 12f and an additive component 14f. The additive component 14f is disposed within filter spaces 16f between filtering elements 12f. As shown, the additive component 14f is located before the center space 18f, so that the additive component is contained within the filtering element arrangement. In such a configuration, the additive material may be released in a more controlled manner through the filtering elements 12f. It will be appreciated that additive component may be located within the center space of the downstream-most filtering element if desired. The additive component 14f includes any suitable additive material, and, as described, may be configured in any suitable chemical in a form such as, but not limited to, a gel, granules, and powders. The chemical form and manner of release are not limited, so long as it can be contained in the spaces between one or more filtering elements until release of the releasable additive is desired.

Figure 7A:
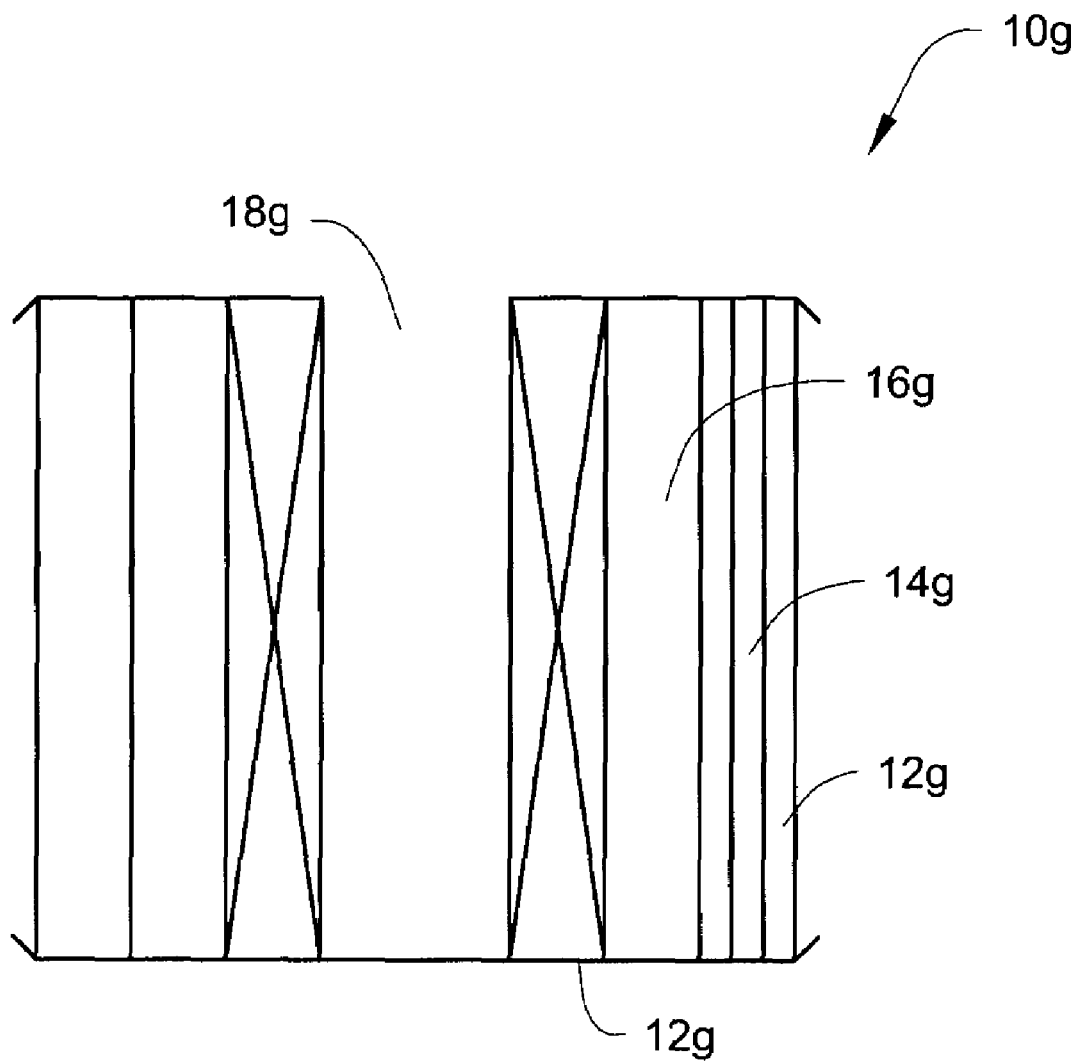
FIG. 7A illustrates a side schematic view of another embodiment of a filtration device incorporating the inventive concepts and showing another embodiment of an additive component embedded in at least one filtering element of the filter component and disposed between filter media layers of a filtering element.
Figure 7B:
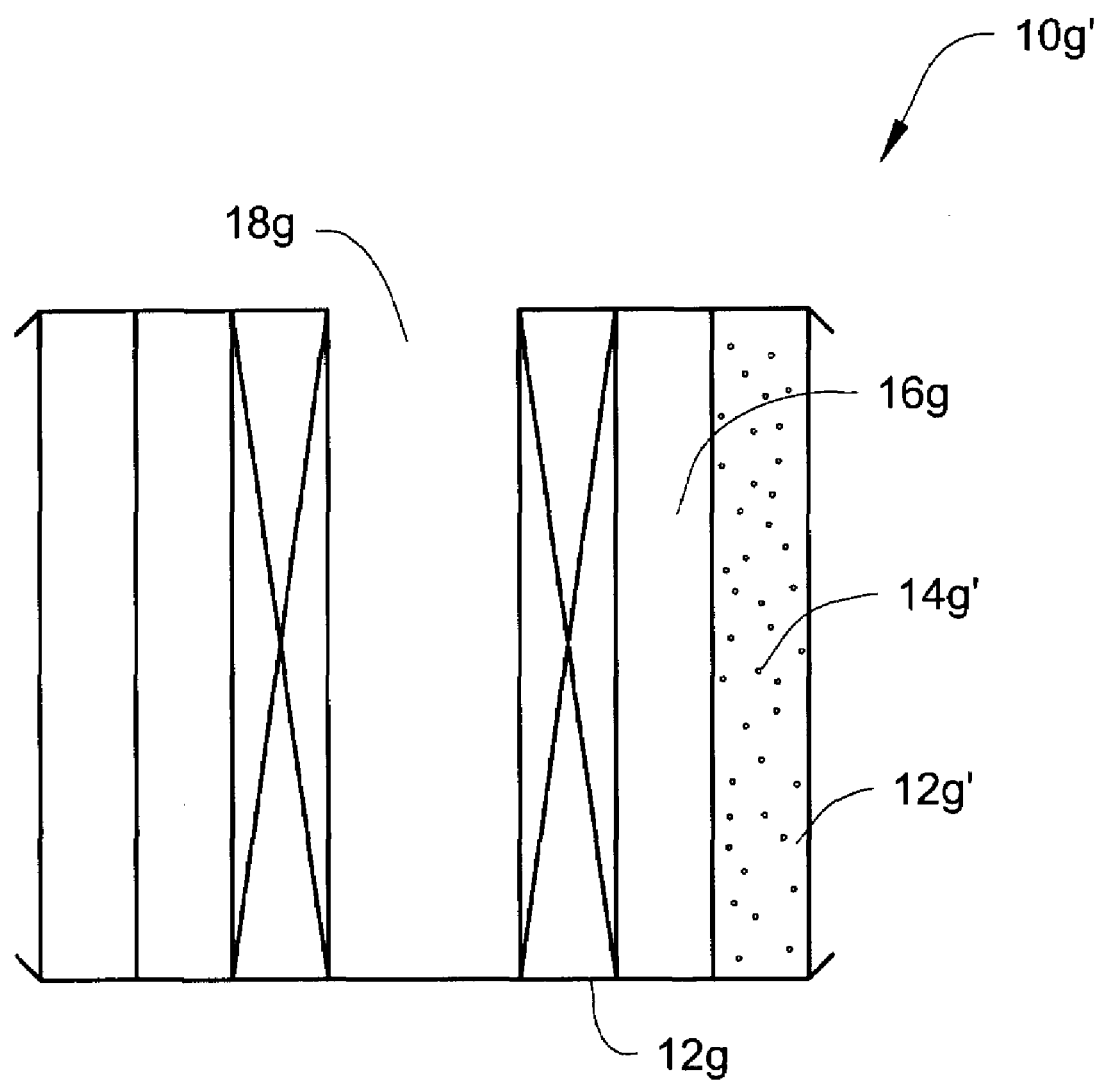
FIG. 7B illustrates a side schematic view of another embodiment of a filtration device incorporating the inventive concepts and showing another embodiment of an additive component embedded throughout at least one filtering element of the filter component.

FIGS. 7A and 7B illustrate other embodiments of a filtration device 10g, 10g'. In FIG. 7A, a filtering element 12g includes the additive component 14g embedded within the filtering element 12g. That is, in this configuration any filtering element of the concentrically arranged filtering elements may contain both the filtering function and the additive component function within any one or more of the filtering elements. As shown, one example of the additive component 14g would include at least one additive material that is embedded between individual layers of filter media of a filtering element 12g. The layers may follow a circumferential shape of the concentric filtering element arrangement. The additive component 14g is configured to introduce the additive material to the fluid being filtered. As one example, the additive component 14g may be configured to release the additive material into any one or more of the filter spaces, including filter spaces 16g.

In FIG. 7B, a filtering element 12g' includes an additive component 14g' embedded therein. Differently from FIG. 7A, the additive component 14g' is embedded, such that an additive material is disposed throughout the filtering element 12g' rather than an embedded layer. It will be appreciated that the meaning of "embedded" is broadly construed to generally mean disposed within. Such a configuration can, but is not limited to soaking an additive material in the filter media of a filtering element, coating the additive material onto filter media of the filtering element (not just coated on the surface), adding the additive material as a layer (as in FIG. 7A), or otherwise putting it in a filtering element. The additive component 14g' may function similarly as in FIG. 7A. That is, any filtering element of the concentrically arranged filtering elements may contain both the filtering function and the additive component function within any one or more of the filtering elements. The additive component 14g' is configured to introduce the additive material to the fluid being filtered. As with FIG. 7A, the additive component 14g' may be configured to release the additive material into any one or more of the filter spaces.

Figure 8:
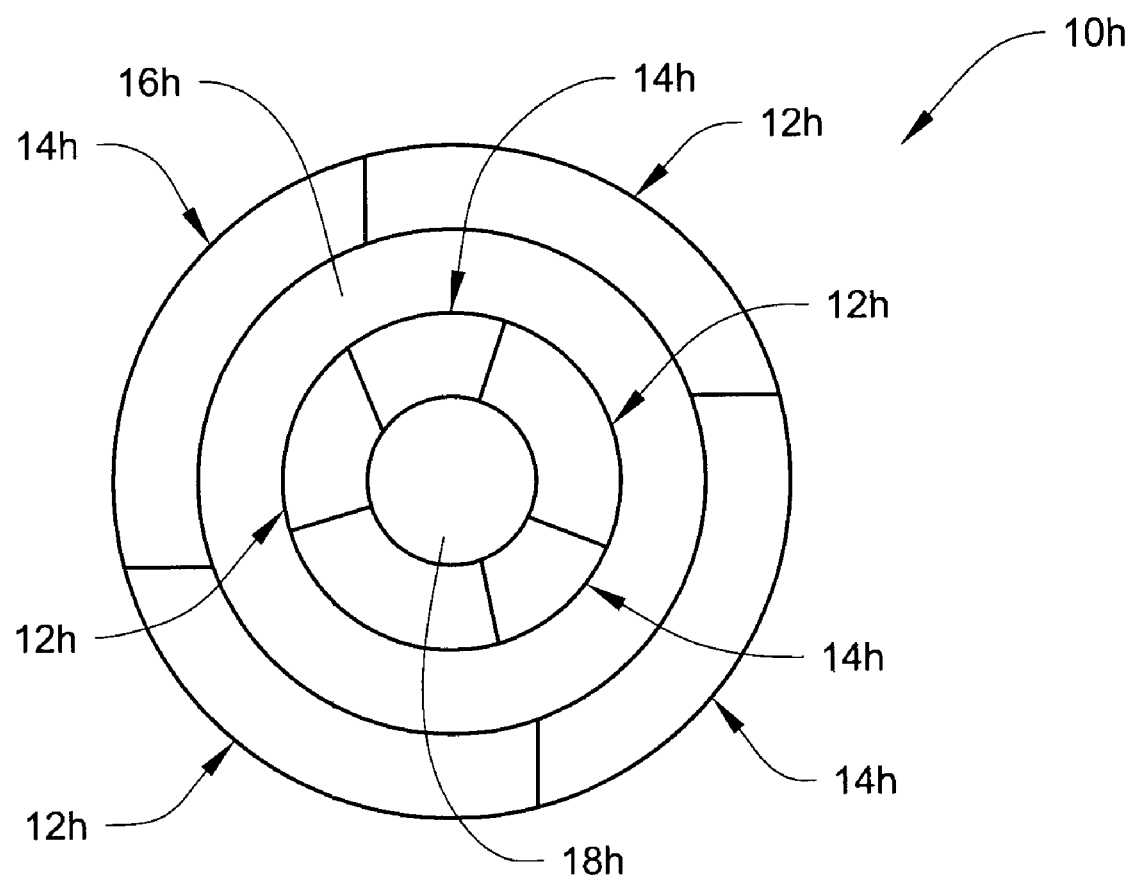
FIG. 8 illustrates a top schematic view of another embodiment of a filtration device incorporating the inventive concepts and showing another embodiment of an additive component configured as multiple sections disposed between multiple sections of at least one filtering element of a filter component.
Figure 9:
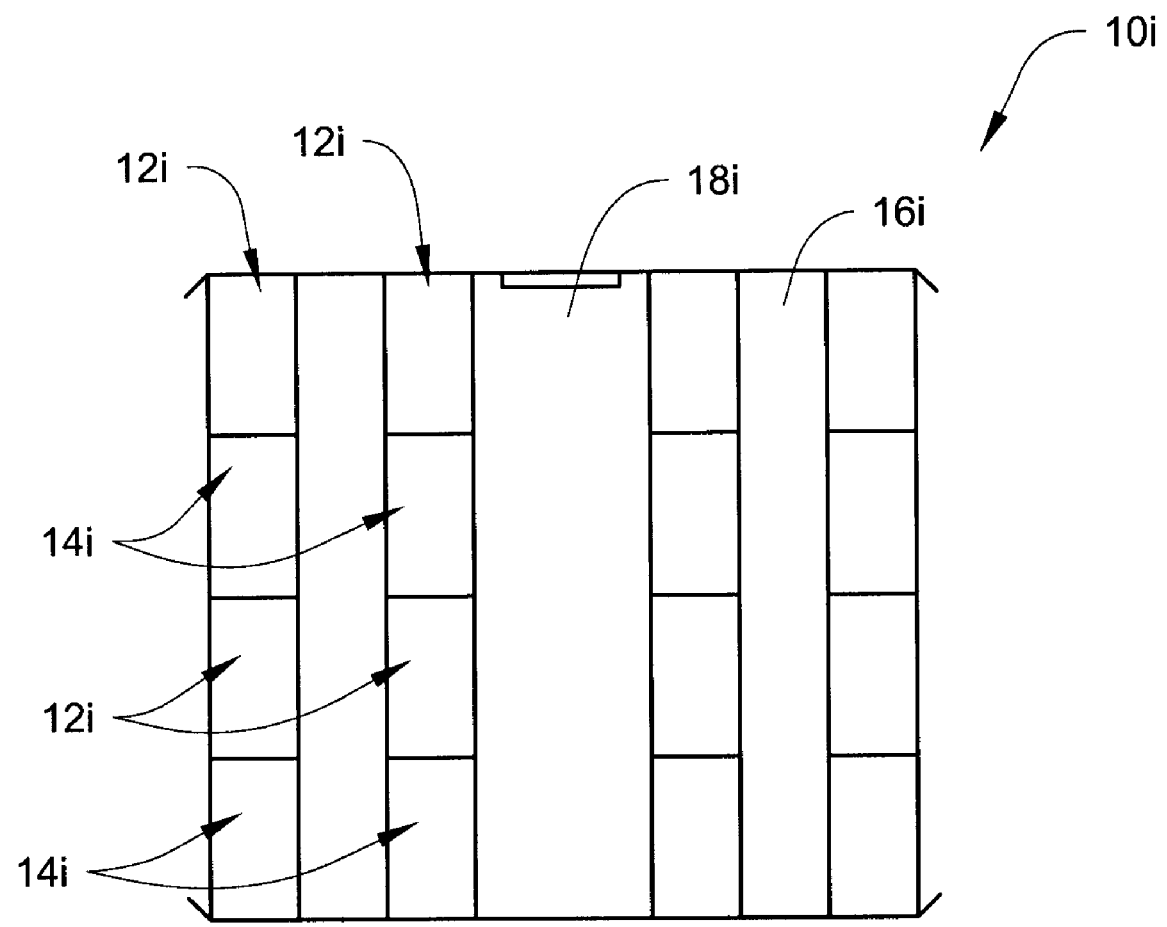
FIG. 9 illustrates a side schematic view of another embodiment of a filtration device incorporating the inventive concepts and showing another embodiment of an additive component configured as multiple sections disposed between multiple sections of at least one filtering element of a filter component.

FIGS. 8 and 9 illustrate separate embodiments for a filtration device 10h, 10i showing different configurations of filtering elements 12h, 12i assembled with additive components 14h, 14i. FIGS. 8 and 9 show filtering elements 12h, 12i composed of individual sections respectively combined with individual sections of an additive component 14h, 14i to form different ring-like configurations within the filter component.

FIG. 8 shows filtering elements 12h and the additive component 14h configured as vertically sliced ("pie shaped") sections assembled together. FIG. 9 shows the filter media of the filtering elements 12i and the additive component 14i as horizontally sliced ("doughnut shaped") sections. The sections may be assembled to give multiple filter media/additive combinations. Differently from the embedded additive component of FIG. 7, the additive component 14h, 14i of FIGS. 8 and 9 can be directly exposed to the filter spaces 16h, 16i between filtering elements and the center space 18h, 18i. It will be appreciated that the sections of filtering elements and additive components are assembled in any suitable manner of attachment and may also be detached from one another. It further will be appreciated that the filtering elements and additive components can remain as separate attachable and detachable components.

Any of the above filtration devices may be suitably employed with existing and novel filtration systems. Turning back to FIG. 10, for example, a known filtration device 50 is shown, and particularly used in a pressure gradient liquid release mechanism. The device 50 includes a housing having a filter component 52 with a filtering element 54. This device employs a pressure gradient liquid release mechanism 58 to release an additive material into the filter component 52. In device 50, a fluid flows from an interior chamber outside the filter component 52 through the filtering element 54 and into the vessel 64 through the initiating orifice 66 and after a seal 66a (if present) is broken. This flow configuration allows the additive material to flow out of the vessel 64, through the release tube 68 and outlet 68a, and into the space 52a of the filter component.

It will be appreciated that the concentrically arranged filters described in FIGS. 1A-9 may be suitably used or substituted in a filtration device, such as the device 50, by replacing the filter component 52. Likewise, the pressure gradient liquid release mechanism 58 may or may not be replaced to implement any of the other additive component configurations described in FIGS. 1A-9.

In the above described inventive embodiments, a filter component having concentrically arranged filtering elements can be combined with various configurations of an additive component. Various known and novel concentrically arranged filters can be implemented with the inventive principles of combining a filter-in-filter component with an additive component. For example, U.S. Provisional Patent Application No. 60/815,118 filed Jun. 20, 2006, which is incorporated herein by reference in its entirety, provides one exemplary construction of a filter within a filter arrangement. It will be appreciated that the filter and additive component configurations of FIGS. 1A-9 may be implemented into such a multiple filter within a filter arrangement.

The inventive concepts of this disclosure provide an improved filtration device. The filtration device described combines the "filter in a filter" concept with various mechanisms for introducing an additive material to a working fluid. Any of the above embodiments described may provide an improved filtration device that can filter fluids more efficiently, for example, by providing improved fine filtration of a working fluid and by providing such benefits as introducing various additive chemicals into a working fluid or releasing the same into a working fluid. As a result, the device can allow working fluids to enjoy extended drainage intervals and can help reduce component wear.

Particularly, the filter within a filter concept along with the additive release mechanisms described herein, have been identified as a combination that can provide superior filtration for customers, and particularly in one example where customers are using high pressure common rail (HPCR) fuel systems, which require very efficient filtration of small micron particles (i.e. <5 micron and lower).

The invention may be embodied in other forms without departing from the spirit or novel characteristics thereof. The embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A filtration device comprising:
   a filter component arranged as a plurality of concentric filtering elements defining filter spaces between the filtering elements, each filtering element having a filter media configured to allow a working fluid to flow through the filter media while removing contaminants from the working fluid; and
   an additive component operatively connected to the filter component, the additive component includes at least one additive material that is configured to be introduced to the working fluid being filtered by the filter component, the additive component comprises
      a vessel disposed at one longitudinal end of the filter component, the vessel containing the at least one additive material,
      an initiating orifice disposed within one of the filter spaces and fluidly communicating the vessel with the filter component, and
      a release tube configured to release the at least one additive material from the vessel into the filter component when the initiating orifice is opened.

2. The filtration device according to claim 1, wherein the filtering elements are assembled as a single stand-alone cartridge.

3. The filtration device according to claim 1, wherein the filtering elements are contained within an exterior housing.

4. The filtration device according to claim 1, wherein the vessel is a vessel for a pressure gradient liquid release mechanism that is configured to release the at least one additive material through the release tube after a downstream-most filtering element of the filter component.

5. The filtration device according to claim 1, wherein the vessel is a vessel for a pressure gradient liquid release mechanism that is configured to release the at least one additive material through the release tube prior to a downstream-most filtering element of the filter component.

6. A filtration device comprising:
   a filter component arranged as a plurality of concentric filtering elements, the filtering elements defining a plurality of filter spaces therebetween, each filtering element having a filter media so as to allow a working fluid to flow through the filter media while removing contaminants from the working fluid; and
   an additive component comprising
      a pressure gradient liquid release vessel disposed at one longitudinal end of the filter component, the vessel containing at least one additive material,
      an initiating orifice disposed within one of the filter spaces and fluidly communicating the vessel with the filter component, and
      a release tube disposed downstream of the initiating orifice, the release tube configured to drive the release of the at least one additive material into one of the filter spaces and prior to a downstream-most filtering element when the initiating orifice is opened.

7. The filtration device according to claim 6, wherein the initiating orifice and the release tube are both disposed in separate filter spaces, such that a pressure differential is created during filtration, where the initiating orifice is located in a higher pressure region of the filter component relative to the release tube.

8. The filtration device according to claim 7, wherein the release tube is disposed in a filter space prior to and adjacent the downstream-most filtering element.

9. The filtration device according to claim 6, wherein the at least one additive material is released in a filter space prior to and adjacent the downstream-most filtering element.

10. A filtration device comprising:
    a filter component arranged as a plurality of concentric filtering elements, the filtering elements defining a plurality of filter spaces therebetween, each filtering element having a filter media so as to allow a working fluid to flow through the filter media while removing contaminants from the working fluid; and
    an additive component comprising
       a pressure gradient liquid release vessel disposed at one longitudinal end of the filter component, the vessel containing at least one additive material,
       an initiating orifice disposed within one of the filter spaces and fluidly communicating the vessel with the filter component, and
       a release tube disposed downstream of the initiating orifice, the release tube configured to drive the release of the at least one additive material into a filter space within a downstream-most filter element when the initiating orifice is opened.

* * * * *